United States Patent [19]

Contour

[11] 4,031,952

[45] June 28, 1977

[54] HEAT ENERGY ACCUMULATOR

[76] Inventor: Bernard Contour, Residence "Les Petits Princes" 27, rue Jacques Lemercier, Versailles (Les Yvelines), France

[22] Filed: Jan. 13, 1975

[21] Appl. No.: 540,729

[30] Foreign Application Priority Data

Jan. 15, 1974 France .............................. 74.01218
Feb. 12, 1974 France .............................. 74.04736

[52] U.S. Cl. .............................. 165/104 S; 60/659; 237/67; 165/107; 165/45; 122/35
[51] Int. Cl.² .......................................... F01K 1/10
[58] Field of Search ............... 237/67; 60/652, 659; 165/104 S, 107, 45; 122/35

[56] References Cited

UNITED STATES PATENTS

| 1,872,927 | 8/1932 | Gay ..................................... 60/659 |
| 3,895,493 | 7/1975 | Rigollot .............................. 60/659 |

FOREIGN PATENTS OR APPLICATIONS 86,528  12/1921  Austria ................................ 60/659

*Primary Examiner*—Albert W. Davis, Jr.
*Attorney, Agent, or Firm*—Wolf, Greenfield & Sacks

[57] ABSTRACT

An energy accumulator for storing large quantities of heat in the form of superheated water includes an excavation which is divided into upper and lower compartments by a horizontal diaphragm. The lower compartment is filled with superheated water from a heat source such as a nuclear or other steam generating facility. The water in the lower compartment is maintained in its superheated condition by a heavy mass of water in the upper compartment which applies its weight and pressure through the diaphragm to the superheated water in the lower compartment. Means are provided for drawing the superheated water from the lower compartment to a heat exchanger in which the heat is transmitted to a fluid heat carrying medium which can be pumped to a location where the heat is to be used, such as for urban heating. The circulatory system associated with the superheated water is closed and the mass of water employed in the system is constant. Means are provided for maintaining the diaphragm in a flat, horizontal position. Means also are provided of the diaphragm.

8 Claims, 4 Drawing Figures

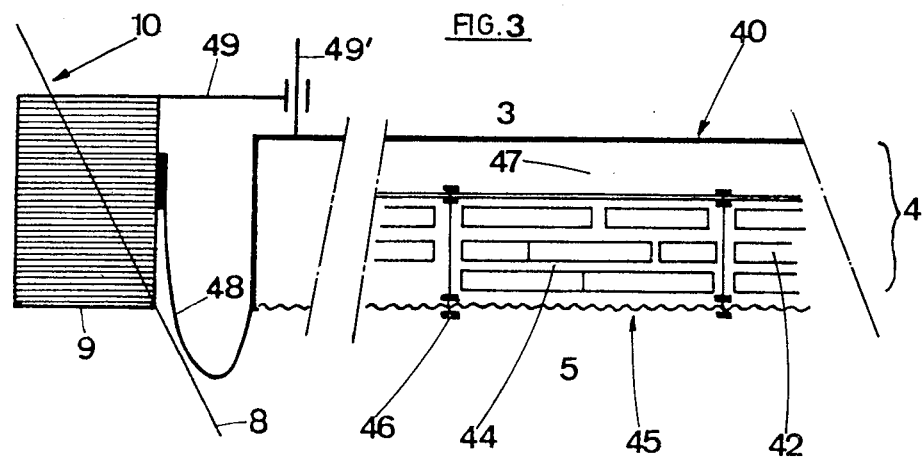
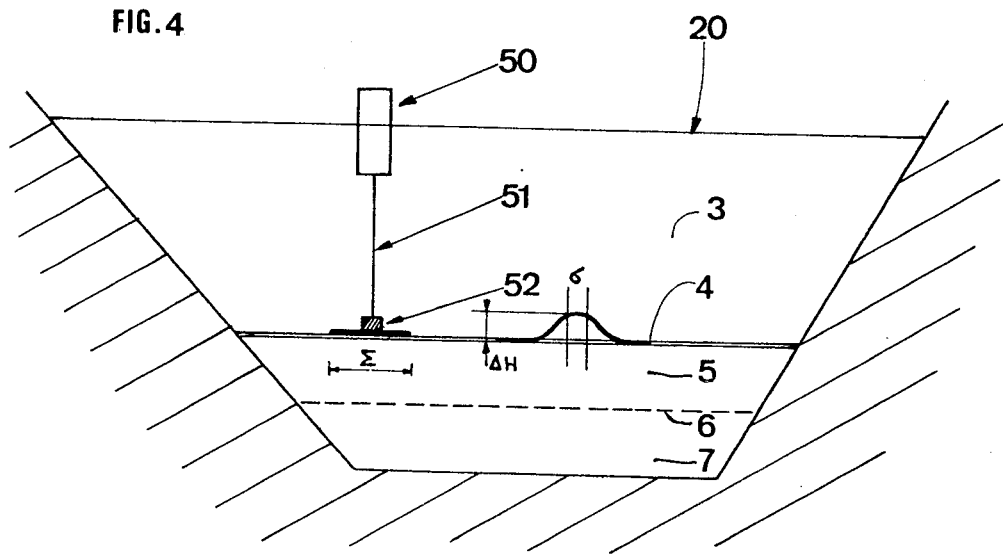

HEAT ENERGY ACCUMULATOR

BACKGROUND AND SUMMARY OF THE INVENTION

This invention relates to a system for accumulating and storing heat energy in the form of superheated water. It may be used, for example, to recover heat energy which ordinarily might be wasted from nuclear or more conventional steam generating systems as are commonly employed by public utilities, industrial plants or the like. In this regard, it is not uncommon for such facilities to waste substantial quantities of energy by discharging heated water into rivers or into the atmosphere. It is amount the primary objects of the invention to provide a system in which such heat energy may be stored without reducing the output (for example, electrical production) of the generating station during normal peak hours of consumption.

The invention includes an enlarged container which may be formed directly in the ground by excavation. The excavation is divided into a pair of upper and lower compartments by a diaphragm which extends in a substantially horizontal plane. The diaphragm is heat insulative and is impermeable. The lower compartment is connected to the heat source (the steam generating plant) to receive superheated water from the heat source. The upper compartment, which is exposed to the atmosphere, is filled with a substantial mass of water which applies a substantial and uniform pressure to the diaphragm and, therefore, to the super-heated water in the lower compartment to preclude the superheated water from boiling and to maintain it in a superheated state. The superheated water from the lower compartment is connected to a load or heat sink circuit by which the superheated water is pumped from the lower compartment to a heat exchanger to heat a working fluid which can be pumped to desired locations, such as urban heating systems. The system is arranged so that the mass of water employed in the superheating, storing and heat discharging circuit is constant.

The diaphragm is attached to the peripheral wall of the excavation by a flexible connection which maintains the isolation between the upper and lower compartments. Means also are provided to maintain the relatively large diaphragm in a substantially flat, horizontal configuration and this includes a plurality of ballast weights located at or attached to the upper surface of the diaphragm at a plurality of locations. Each of the ballast weights is connected by a cable to a partly submerged float which floats at the upper surface of the water in the upper compartment. This resists any tendency for the diaphragm to deform from its substantially horizontal flat configuration.

It is among the objects of the invention to provide an improved system to recapture and store heat energy from a steam generating station or the like.

A further object of the invention is to provide a system of the type described in which the heat energy is stored in the form of superheated water.

Another object of the invention is to provide a system of the type described in which the superheated water is stored in an enlarged excavation which is separated by a diaphragm into upper and lower compartments and in which the superheated water is stored in the lower compartment.

Another object of the invention is to provide a system of the type described in which the superheated water is circulated in a closed circulatory system having a constant mass of water.

Still another object of the invention is to provide a system of the type described having means for stabilizing the diaphragm to maintain it in a substantially flat, horizontal configuration.

DESCRIPTION OF THE DRAWINGS

The foregoing and other objects and advantages of the invention will be understood more fully from the following further description thereof, with reference to the accompanying drawings wherein:

FIG. 3 is an enlarged cross-sectional diagrammatic illustration of a typical portion of the diaphragm; and FIG. 4 is a diagrammatic illustration of the ballast and float device to insure stability in the shape of the diaphragm.

DESCRIPTION OF THE PREFERRED EMBODIMENT

Figure 1:
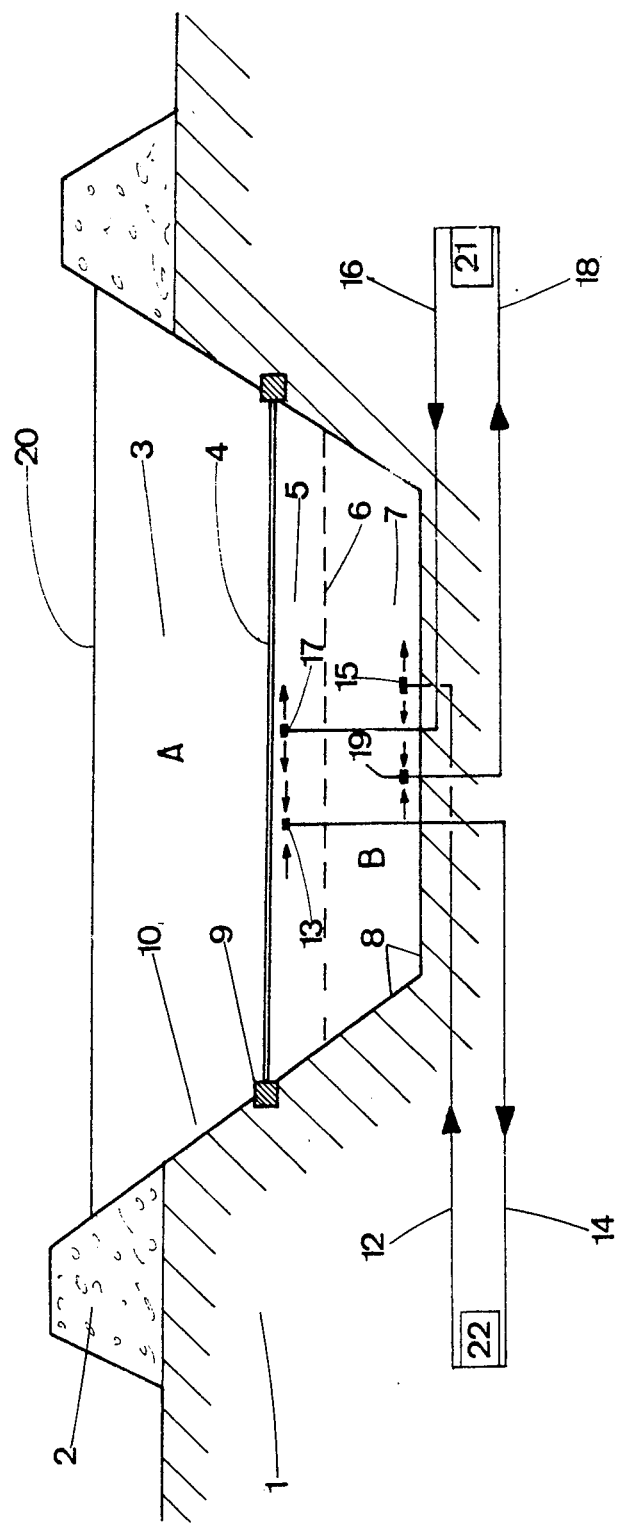
FIG. 1 is a diagrammatic illustration of the compartmented excavation for storing the superheated water.

As shown in FIG. 1, the energy accumulator may be considered as being in an enlarged container of circular cross section, excavated from the ground 1 and being of truncated conical shape. The excavated earth may be gathered about the periphery of the excavation to define an encircling embankment 2. The excavation is separated into an upper compartment A and a lower compartment B by a substantially flat diaphragm 4 which lies along a horizontal plane. Thus, the upper compartment A is defined at its bottom by the diaphragm 4 and about its sides by the surrounding side wall 10. The upper compartment A is open to the atmosphere and is intended to hold cold water 3 with a free upper surface 20.

The lower compartment B is defined by its bottom and lateral walls 8 and, on top, by the underside of the diaphragm 4. The lower compartment B is unexposed to the atmosphere. The upper and lower compartments A and B are suitably sealed to preclude water leakage. The side wall 10 of the upper compartment A, which holds cold water 3, may be sealed by any of a variety of commonly employed techniques used in the construction of water channels, weirs, barrages or the like. The sealing of the bottom and side walls 8 and of the lower compartment, which will receive superheated water 5, may be achieved by placing an elastomeric film on top of a layer of sand fully which covers the bottom and side walls 8.

The lower compartment B is intended to receive and store superheated water 5, for example, at a temperature of the order of 140° C. In order to maintain the superheated water in the lower compartment B at its elevated temperature, the upper compartment A is filled with a substantial mass of water which applies a continuous, uniform pressure to the diaphragm 4 and to the superheated water contained in the lower chamber. By way of example, in order to maintain the superheated water in the lower compartment B at 140° C and to prevent boiling, a depth of 30 meters of water in the upper compartment A will be required in order to prevent the superheated water from boiling, which will occur at 143° C at this pressure.

Figure 2:
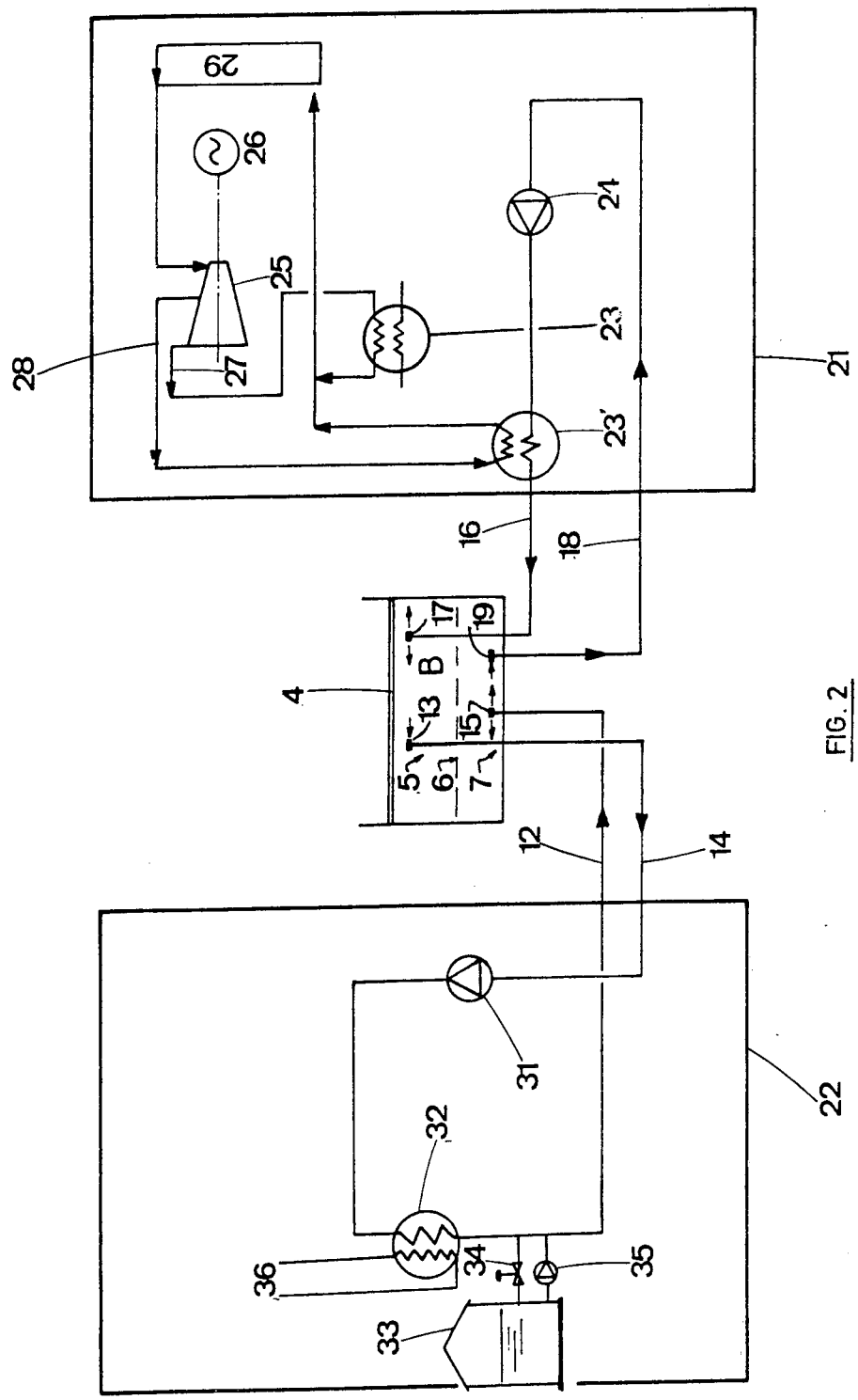
FIG. 2 is a diagrammatic illustration of the manner in which the storage facility in FIG. 1 is connected to the heat source for the superheated water and to the discharge circuit.

The lower compartment B is connected to a source 21 of the superheated water as well as to a load circuit including one or more heat sinks indicated at 22 where the stored heat energy is distributed. For example, as shown in FIG. 2, the heat source 21 which generates the superheated water may include a turbo-alternator 25, 26 which is fed with steam from a boiler 29 which may be of the nuclear fueled type. A heat exchanger 23 is connected to a take off of the steam turbine 25, as indicated at 28. The heat exchanger 23' is interposed in a line 16 through which water is circulated to the lower compartment B by pump 24. Water is returned through line 18 to the pump where it is recirculated continuously. It should be noted that the take-off of steam indicated at 28, from the turbine 26 in order to operate the heat exchanger 23' does cause a power loss at the turbine 25 and, therefore, a reduction in the power output of the alternator 26. This, however, may be done during off-peak hours of electric consumption because the heat which will ultimately be developed will be stored for subsequent use in the form of the superheated water. It may be noted that a substantial portion of the energy developed even during the off-peak hours would ordinarily be lost because the heat energy of the steam 27 at the outlet of turbine 26 would ordinarily be lost in the usual condensor 23 employed in such a system.

The delivery line 16 from the heat source 21 to the lower compartment B directs the superheated water into the upper region of compartment B at an outlet 17 which is constructed and arranged to discharge the superheated water at a low velocity and in a manner which avoids swirls and turbulent mixing of the water in the lower compartment B for reasons to be described below. Similarly, the return line 18 from the lower compartment B to the heat source 21 has an inlet 19 which similarly is designed to minimize turbulent, mixing flow of water in the lower compartment B. The return inlet 19 is located near the bottom of the lower compartment B.

The superheated water from lower compartment B is drawn through a discharge circuit to the heat sink 22 where the heat may be used as desired, for example, to heat urban dwellings. The discharge circuit includes a pump 31 interposed along the line 14 which directs the superheated water to a heat exchanger 32 and then, through line 12 back to the lower compartment B. The superheated water for line 14 is drawn from the upper region of lower compartment B by an inlet device designed to minimize turbulence and similar in construction to inlet nozzle 19 mentioned above. Return line 12 discharges the return water from heat sink 22 at a location near the bottom of lower compartment B through a discharge nozzle 15 similar to discharge nozzle 17 referred to above which minimizes turbulent flow. Heat exchanger 32 is connected by lines 36 to one or more heat sinks (such as radiator elements in urban dwellings) where the heat is ultimately used for its intended purpose.

The lower compartment B is intended to hold the superheated water with minimal turbulence and in which the hottest masses of water in the compartment B will be disposed at the upper portions of the compartment and in which the more cool masses will be near the bottom. For this reason, the outlet 17 and inlet 13 are disposed near the upper ends of the lower compartment B to discharge and ingest, respectively, the hottest water in lower compartment B. Similarly, the return outlet 15 and return inlet 29 are located near the bottom of the compartment. The water in the lower compartment B assumes a somewhat stratified configuration in which the superheated water 5 is contained in the upper part of the compartment B and the cooler water, from return line 12, is in the lower part 7. The superheated water 5 and cooler water 7 is separated by a substantially planar transition layer 6 which may be some decimeters thick. The transition layer 6 will tend to move somewhat up and down depending on the relative rate at which heat is being supplied to the water in the compartment B as compared to the rate at which heat is being withdrawn through the discharge or heat sink circuit. For example, the transition layer 6 will tend to move upwardly when the load of the heat sink 22 is increased with respect to the heat input from the heat source 21. Conversely, where the load on heat sink 22 is reduced in comparison with the heat input from heat source 21, the transition layer 6 will tend to move downwardly. By way of example, the water temperature at the upper region of the compartment B may be of the order to 140° C whereas the water in the lower part of the compartment B may be of the order of 80° C. The inlets and nozzles 13, 15, 17 and 19 are designed so as not to disturb the somewhat laminar temperature gradiant in the lower compartment as well as the transition layer 6.

The circulatory system for the superheated water including the lower compartment B, heat exchangers 23' and 32 and their interconnected lines and pumps is a wholly closed, recirculating system. In order to be able to accommodate expansion and contraction of the water within this closed system, the system includes an expansion chamber 33. The expansion chamber 33 is connected to line 12 downstream of heat exchanger 32 independently through a valve 34 and also through an independent pump 35. When the operation of the system requires expansion, valve 34 opens to permit the surplus volume of water to enter the expansion chamber. Should the reverse situation occur, pump 35 is operated to reinject the water from the expansion chamber back into line 12. This enables the volume of lower compartment B to be maintained constant thereby maintaining the diaphragm 4 at a constant plane and in a horizontal position.

The diaphragm 4 serves a number of functions including the physical separation of the cold water 3 from the superheated water 5, heat insulation to minimize heat transfer from the superheated water 5 to the cold water 3, and the transmission of pressure of the mass of cold water 3 to the superheated water 5 to prevent the superheated water from boiling. FIG. 3 shows a preferred construction for the diaphragm 4. The diaphragm 4 includes a metallic structure 47 having a metallic plate at its upper end. The bottom of the diaphragm 4 is covered with a corrugated, self-expandable, metal skin 45 which is supported by and attached to the structure 47 by clamps 46. The clamps 46 preferably are made from a material which is somewhat insulative, for example, teflon, to minimize heat leaks through the diaphragm. The internal space 44 of the diaphragm is filled with insulating panels 42 and the interior of the diaphragm is inflated to a pressure equal to that exerted by the water onto the diaphragm. The diaphragm assembly is attached to the side wall 8 of the excavation by a ring 9 which is embedded in the sidewall 8. A flexible member 48 connects the periphery of the diaphragm to the wall 8, preferably by attachment to the ring 9. In order to stabilize the diaphragm in a centered position in the excavation, a guide 49 is attached integrally to and extends from the ring 9 and cooperates with a rod 49' attached to the diaphragm and which is received in the guide 49.

From the foregoing it should be apparent that it is important to maintain the diaphragm in a horizontal, flat and planar configuration. In order to further insure that the diaphragm 4 is maintained in its flat, horizontal position, even when unexpected deforming forces may be applied to it (for example, hydrostatic forces) further stabilizing means, illustrated in FIG. 4, may be provided. FIG. 4 shows one of a plurality of ballast and float devices which stabilize and help to maintain the diaphragm in its flat configuration. As shown, a cylindrical float 50 is connected by a cable 51 to a weighted ballast 52 which rests on and may be attached to the diaphragm 4. The float 50 is partly submerged and the length of the cable 51 is selected so that the buoyancy of the float will just balance the apparent weight of the cable 51 and ballast 52. Should there be any tendency for the portion of diaphragm with which the float, cable and ballast are associated to deform from its flat, horizontal position, that tendency will be resisted. For example, if the diaphragm tended to bubble upwardly, that would raise the float 50 thus increasing the apparent weight of the cable 51 and ballast 52. Similarly, if the diaphragm tended to shift downwardly in that region, the upward buoyant effect of the attached float 50 would be increased.

The foregoing may be illustrated mathematically as indicated in FIG. 4 which shows a finite region of the diaphragm 4 being deformed upwardly. The deformed region is displaced from the median level of the diaphragm 4 by a height $\Delta H$. That deformed region of the diaphragm 4 will be subjected to an additional differential pressure equal to:

$$(\rho_f - \rho_s)g\Delta H$$

where:
$\rho_f$ is the density of the water 3;
$\rho_s$ is the density of the superheated water 5;
$g$ is the acceleration of gravity;
$\Delta H$ is the deformation of the diaphragm.

This pressure is directed upwardly against the bottom of diaphragm if $\Delta H$ is positive and tends to increase the deformation.

By employing the foregoing float, cable and ballast system a zone ($\Sigma$) of the diaphragm associated with a float is stabilized against such deforming forces. The resisting thrust of the float with a cross section $S$ may be represented as follows:

$$-\rho_s g S \Delta H$$

Thus, the stability conditions are as follows:

$$-\rho_s g S \Delta H + \Sigma g(\rho_f - \rho_s)\Delta H < 0$$

Viz:

$$S/\Sigma > (\rho_f - \rho_s)/\rho_s$$

It should be understood that the foregoing description of the invention is intended merely to be illustrative thereof and that other modifications and embodiments may be apparent to those skilled in the art without departing from its spirit.

Having thus described the invention, what I desire to claim and secure by Letters Patent is:

1. A system for accumulating and storing heat energy comprising:
   means defining a container having bottom and side walls;
   a horizontally extending diaphragm disposed above the bottom wall of the container and separating the container into an upper compartment and a lower compartment, said lower compartment being filled with heated water;
   the upper compartment being filled with a heavy mass sufficient to apply a uniform pressure to the diaphragm and to the heated water in the lower compartment, said pressure being of a magnitude which is no less than that exerted on the diaphragm by the water in the lower compartment;
   first fluid circuit means for communicating the water in the lower compartment with a heat source to circulate water between the lower compartment and the heat source;
   second fluid circuit means for communicating the water in the lower compartment with a heat sink to circulate hot water from the lower compartment between it and the heat sink;
   said lower compartment, first fluid circuit and second fluid circuit comprising a closed fluid circuit in which the mass of water is constant.

2. A system as defined in claim 1 further comprising:
   said water in the lower compartment being superheated; and
   said heavy mass in the upper compartment comprising a fluid having a mass sufficient to prevent the superheated water in the lower compartment from boiling.

3. A system as defined in claim 1 wherein the diaphragm is heat insulative.

4. A system as defined in claim 1 further comprising:
   the periphery of the diaphragm being spaced from the side wall of the container; and
   a flexible web connecting the periphery of the diaphragm and the side wall of the container.

5. A system as defined in claim 1 further comprising:
   means responsive to displacement of a portion of the diaphragm from the plane of the diaphragm for resisting said displacement and maintaining said portion in said plane.

6. A system as defined in claim 5 wherein said heavy mass is fluid and wherein said means for resisting said displacement of said diaphragm comprises:
   a plurality of floats partly submerged in the fluid in the upper compartment;
   each float having a cable attached thereto and extending downwardly therefrom toward the diaphragm;
   a weighted ballast attached to the lower end of each of said cables, said ballast being disposed at the level of the diaphragm;
   the float, cable and ballast being constructed so that the buoyancy of the float equals the apparent weight of the cable and ballast when the portion of the diaphragm is in the plane of the diaphragm.

7. A system as defined in claim 6 wherein each of the weighted ballasts is attached to the diaphragm.

8. A system as defined in claim 1 wherein said diaphragm further comprises:
   said diaphragm being of hollow metallic construction and having a plurality of heat insulative panels;
   said diaphragm being deflated to a pressure substantially equal to that exerted by the mass in the upper compartment.

* * * * *